United States Patent Office 3,663,729
Patented May 16, 1972

3,663,729
PROCESS FOR PREPARING
4-OXAPHOSPHORINANES
Peter Tavs, Limburgerhof, Germany, assignor to Badische Anilin- & Soda-Fabrik Aktiengesellschaft, Ludwigshafen (Rhine), Germany
No Drawing. Filed Dec. 17, 1969, Ser. No. 886,044
Claims priority, application Germany, Jan. 8, 1969,
P 19 00 706.8
Int. Cl. C07f 9/02
U.S. Cl. 260—606.5 P
14 Claims

ABSTRACT OF THE DISCLOSURE

A process for preparing 4-oxaphosphorinanes having the general formula:

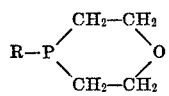

where R denotes an aliphatic radical having one to twenty carbon atoms and a process for the production of the same which comprises reacting a divinyl ether with hydrogen phosphide or a monosubstituted organic phosphine in the presence of actinic light or a substance which decomposes into free radicals under the reaction conditions and also in the presence of a solvent which is inert under the reaction conditions. The products are suitable as modifying agents for cobalt carbonyl complexes.

This invention relates to 4-oxaphosphorinanes not hitherto described and to a process for the production of 4-oxaphosphorinanes by reaction of divinyl ethers with monosubstituted phosphines.

It is known from Bull. Soc. Chim. Belges, vol. 42, pp. 210 to 212, that 1-phenyl-4-oxaphosphorinane is obtained by reaction of phenylphosphine-bismagnesium bromide with 2,2′-diiododiethyl ether. The process has the disadvantage that it is necessary to use starting materials which are not easily accessible. The use of phenyl-phosphine-bismagnesium bromide has proved to be particularly disadvantageous for industrial exploitation of the process. It is also known from U.S. patent specifification No. 2,803,597 that in the reaction of phosphines which contain at least one hydrogen atom on the phosphorus atom with olefinically unsaturated compounds, the corresponding substituted phosphines are obtained. It is stated however that when bifunctional starting materials are used it is mainly polymers that are formed.

It is an object of the invention to provide hitherto undisclosed oxaphosphorinanes having the general formula:

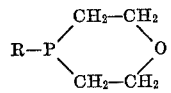

where R denotes an aliphatic radical having one to twenty carbon atoms.

Another object of the invention is to provide a process in which 4-oxaphosphorinanes are obtained on an industrial scale and in good yields.

In accordance with this invention these and other objects and advantages are achieved in a process for the production of 4-oxaphosphorinanes which comprises reacting a divinyl ether with hydrogen phosphide or a monosubstituted organic phosphine in the presence of actinic light or in the presence of a substance which decomposes into free radicals under the reaction conditions, and also in the presence of an inert solvent.

The new process is remarkable because it would have been expected that polymerized chainlike condensation products would be formed by reaction of hydrogen phosphide or a monosubstituted phosphine containing two hydrogen atoms on the phosphorus atom with a divinyl ether.

Preferred monosubstituted phosphines bear as substituents an aliphatic radical having one to twenty carbon atoms which may bear as substituents alkoxy groups having one to four carbon atoms, a phenyl radical, a cyclohexyl radical, or a carbalkoxy radical having two to seven carbon atoms. Monoalkylphosphines having one to twenty carbon atoms, particularly those with linear alkyl, are especially preferred. Mono-n-alkylphosphines having eight to twenty carbon atoms have achieved particular industrial importance. Examples of suitable monosubstituted phosphines are n-butylphosphine, n-octylphosphine, n-dodecylphosphine, n-octodecylphosphine, eicosylphosphine, benzylphosphine, cyclohexylethylphosphine and ethoxyethylhosphine.

The monosubstituted phosphine or hydrogen phosphide and the divinyl ether are generally used in about the stoichiometric amounts. It has proved to be advantageous however the use the divinyl ether in a slight excess, for example of up to 10 mole percent.

The reaction will take place within a wide range of temperature, for example at temperatures of from 0° to 160° C. It is adavntageous to use a temperature of from 15° to 150° C. The reaction temperature is advantageously chosen so that the half-life period of the compounds which decompose into free radicals is of adequate length for the reaction; this can easily be ascertained by preliminary experiment. When starting materials are used which are gaseous under the reaction conditions, the reaction may advantageously be carried out at superatmospheric pressure, for example of up to 30 atmospheres.

The reaction is carried out in the presence of a solvent which is inert under the reaction conditions. Examples of suitable solvents are hydrocarbons such as pentane, benzene or cyclohexane; chlorohydrocarbons containing chlorine in aromatic combination, such as chlorobenzene; and ethers such as diethyl ether or tetrahydrofuran. It is advantageous to use such an amount of solvent that the concentration of the sum of monosubstituted phosphine and divinyl ether in the solution is from 0.5 to 20%, particularly from 1 to 12%, by weight.

The reaction is carried out in the presence of a compound which decomposes into free radicals under the reaction conditions. Preferred compounds of this type are for example ethanes bearing phenyl radicals as substituents such as hexaphenylethane, 1,2- diphenyltetramethylethane, diazo or azo compounds such as phenyldiazoacetate or azo-bis-isobutyronitrile, hydrazines bearing phenyl radicals as substituents such as tetraphenylhydrazine or tetrapara-tolylhydrazine, or peroxides such as benzoyl peroxide, tert-butyl hydroperoxide or di-tert-butyl peroxide. Aliphatic azo compounds and peroxides are particularly preferred.

The compounds which decompose into free radicals are generally used in concentrations of from 0.5 to 20%, preferably from 2 to 15%, by weight with reference to the amount of hydrogen phosphide or monosubstituted phosphine used.

The reaction will also take place under the action of actinic light. Suitable actinic light has a wavelength for example of from 200 to 380 millimicrons. Actinic light may be produced for example with mercury vapor lamps. It is also possible to use actinic light in combination with compounds which decompose into free radicals.

The reaction is advantageously carried out while excluding molecular oxygen. This is achieved in industry for example by using an atmosphere of an inert gas, for example nitrogen.

The process according to the invention may be carried out for example by placing in a reactor a solution of a monosubstituted phosphine and one of the said divinyl ethers dissolved in one of the said solvents at the said concentrations and then exposing them to irradiation with ultra-violet lamps or adding a compound which decomposes into free radicals. The reaction is generally over within six to thirty hours. The reaction mixture obtained is subjected to fractional distillation, the 4-oxaphosphorinane being obtained in pure form.

The 4-oxaphosphorinanes prepared by the process according to the invention are outstandingly suitable as modifying agents for cobalt carbonyl complexes which are to be used as catalysts for the oxo synthesis.

The following examples illustrate the invention. The parts given in the following examples are by weight. They bear the same relation to parts by volume as the kilogram to the liter.

EXAMPLE 1

A solution of 30 parts of divinyl ether and 500 parts by volume of pentane devoid of water and olefin and also 3.8 parts of azodiisobutyronitrile are placed in a high pressure vessel having a capacity of 1000 parts by volume and the molecular oxygen is expelled by scavenging with nitrogen. Then 38 parts of hydrogen phosphide is pumped in. The reaction mixture is then heated for twelve hours at 75° to 80° C. at a pressure of 10 atmospheres while mixing well. After cooling and expansion, the reaction mixture is fractionally distilled. 3.2 parts (7% of the theory) of 4-oxaphosphorinane is obtained having a boiling point of from 45° to 46° C. at 16 mm.

*Analysis.*—Calculated (percent): C, 46.1; H, 8.6; P, 29.8. Found (percent): C, 45.6; H, 8.7; P, 29.0.

EXAMPLE 2

A solution of 101 parts of n-dodecylphosphine and 60 parts of divinyl ether in 2500 parts by volume of diethyl ether is irradiated in a reactor for twenty hours at 20° C. with a quartz lamp (Hanau Q 81). The reaction mixture is then fractionally distilled. 78 parts of 1-dodecyl-4-oxaphosphorinane is obtained having a boiling point of from 155° to 157° C. at 0.5 mm. This is a yield of 57% of the theory.

*Analysis.*—Calculated (percent): P, 11.4 Found (percent): P, 10.8.

EXAMPLE 3

The procedure described in Example 2 is followed but using a starting mixture of 28.6 parts of octadecylphosphine and 14 parts of divinyl ether in 300 parts by volume of diethyl ether. 14.6 parts (42% of the theory) of 1-octadecyl-4-oxaphosphorinane is obtained having a boiling point of from 211° to 212° C. at 0.5 mm.

*Analysis.*—Calculated (percent): P, 8.7. Found (percent): P, 8.1.

EXAMPLE 4

The procedure of Example 2 is followed but a starting mixture is used which consists of 53 parts of octylphosphine and 33 parts of divinyl ether in 3000 parts by volume of diethyl ether. 40 parts (51% of the theory) of 1-octyl-4-oxaphosphorinane is obtained having a boiling point of 109° to 110° C. at 0.5 mm.

*Analysis.*—Calculated (percent): P, 14.3. Found (percent): P, 14.1.

EXAMPLE 5

The procedure of Example 2 is followed but a starting mixture of 23 parts of tetradecylphosphine and 11 parts of divinyl ether in 300 parts by volume of diethyl ether is used. 12 parts (40% of the theory) of 1-tetradecyl-4-oxaphosphorinane is obtained having a boiling point of 150° to 152° C. at 0.1 mm.

*Analysis.*—Calculated (percent): P, 10.3. Found (percent): P, 9.8.

I claim:

1. A process for the production of a 4-oxaphosphorinane which comprises reacting a divinyl ether with hydrogen phosphide or a monosubstituted organic phosphine which has an aliphatic radical having one to twenty carbon atoms in the presence of actinic light or a substance which decomposes into free radicals under the reaction conditions, at a temperature of from 0° to 160° C. and in the presence of a solvent which is inert under the reaction conditions, said solvent being employed in an amount such that the concentration of the sum of monosubstituted organic phosphine and divinyl ether in the solution is from 0.5 to 20% by weight.

2. A process as claimed in claim 1 wherein a monoalkylphosphine having one to twenty carbon atoms is used.

3. A process as claimed in claim 1 wherein a mono-n-alkylphosphine having two to twenty carbon atoms is used.

4. A process as claimed in claim 1 wherein from 1 mole up to an excess of 10 mole percent of divinyl ether is used for each mole of monosubstituted organic phosphine.

5. A process as claimed in claim 1 carried out at a temperature of from 15° to 150° C.

6. A process as claimed in claim 1 carried out at a pressure of up to 30 atmospheres.

7. A process as claimed in claim 1 wherein a chlorohydrocarbon containing chlorine in aromatic combination is used as a solvent.

8. A process as claimed in claim 1 wherein a hydrocarbon is used as a solvent.

9. A process as claimed in claim 1 wherein an ether is used as a solvent.

10. A process as claimed in claim 1 wherein the amount of solvent used is such that the concentration of the sum of monosubstituted organic phosphine and divinyl ether in the solution is from 1 to 12% by weight.

11. A process as claimed in claim 1 wherein an aliphatic azo compound is also used.

12. A process as claimed in claim 1 wherein a peroxide is also used.

13. A process as claimed in claim 1 wherein from 0.5 to 20% by weight (with reference to the weight of hydrogen phosphide or monosubstituted phosphine used) of a compound which decomposes into free radicals is used.

14. A process as claimed in claim 1 wherein the reaction is carried out while excluding molecular oxygen.

References Cited

UNITED STATES PATENTS 2,160,915  6/1939  Schreiber _____ 260—606.5 P
3,010,946  11/1961  Garner _____ 260—606.5 P TOBIAS E. LEVOW, Primary Examiner W. F. W. BELLAMY, Assistant Examiner U.S. Cl. X.R.

204—158 R